(12) United States Patent
Shimizu et al.

(10) Patent No.: US 7,027,288 B2
(45) Date of Patent: Apr. 11, 2006

(54) MULTILAYER CERAMIC CONDENSER

(75) Inventors: Michihisa Shimizu, Chuo-ku (JP);
Kazunori Ito, Nikaho-machi (JP);
Toshiaki Komatsu, Nikaho-machi (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/204,115

(22) Filed: Aug. 16, 2005

(65) Prior Publication Data

US 2006/0044732 A1    Mar. 2, 2006

(30) Foreign Application Priority Data

Aug. 30, 2004    (JP)    ............................. 2004-250771

(51) Int. Cl.
*H01G 4/005*    (2006.01)
*H01G 4/06*    (2006.01)
(52) U.S. Cl. ....................... 361/303; 361/311; 361/329
(58) Field of Classification Search ........ 361/303–304, 361/311–313, 328–330
See application file for complete search history.

(56) References Cited

U.S. PATENT DOCUMENTS 5,657,199 A * 8/1997 Devoe et al. ................ 361/328
6,052,272 A * 4/2000 Kuroda et al. .............. 361/303
6,760,215 B1 * 7/2004 Devoe ........................ 361/303

FOREIGN PATENT DOCUMENTS

JP        A 8-37126        2/1996

* cited by examiner

*Primary Examiner*—Eric W. Thomas
(74) *Attorney, Agent, or Firm*—Oliff & Berridge, PLC

(57) ABSTRACT

A multilayer ceramic condenser comprises a multilayer body constituted by a plurality of dielectric layers laminated together, first and second terminal electrodes respectively positioned on opposite side faces of the multilayer body, and a plurality of inner electrode groups provided within the multilayer body in a laminating direction of the multilayer body. Each inner electrode group includes a first inner electrode connected to the first terminal electrode, a second inner electrode connected to the second terminal electrode, and a third inner electrode connected to none of the first and second terminal electrodes. The first, second, and third inner electrodes are arranged so as to hold the dielectric layer therebetween such that a plurality of capacitors connected in series are formed between the first and second inner electrodes. The number of capacitors formed in the outermost inner electrode group in the laminating direction of the multilayer body is greater than the number of capacitors formed in the inner electrode group positioned on the inner side of the outermost inner electrode group.

3 Claims, 7 Drawing Sheets

MULTILAYER CERAMIC CONDENSER

BACKGROUND OF THE INVENTION

1. Field of the Invention

The present invention relates to a multilayer ceramic condenser.

2. Related Background Art

Known as this kind of multilayer ceramic condenser is one comprising a multilayer body constituted by a plurality of dielectric layers laminated together, first and second terminal electrodes respectively positioned on opposite side faces of the multilayer body, and a plurality of inner electrode groups provided within the multilayer body in a laminating direction thereof (see, for example, Japanese Patent Application Laid-Open No. HEI 8-37126). Each inner electrode group includes a first inner electrode connected to the first terminal electrode, a second inner electrode connected to the second terminal electrode, and a third inner electrode connected to none of the first and second terminal electrodes. The first to third inner electrodes are arranged so as to hold the dielectric layer therebetween such that a plurality of capacitors connected in series are formed between the first and second inner electrodes.

Since a plurality of capacitors connected in series between the first and second inner electrodes are formed in the multilayer ceramic condenser disclosed in Japanese Patent Application Laid-Open No. HEI 8-37126, the voltage applied to each capacitor decreases, whereby a higher withstand voltage can be achieved within the component. The multilayer ceramic condenser disclosed in Japanese Patent Application Laid-Open No. HEI 8-37126 can raise the surface flashover voltage.

SUMMARY OF THE INVENTION

Meanwhile, multilayer ceramic condensers have recently been reducing their sizes and increasing their capacities in response to demands for smaller sizes, lower profiles, surface mounting, and the like of electronic devices. This trend toward smaller sizes/lower profiles and greater capacities has been spreading to multilayer ceramic condensers for back lights of liquid crystal displays, switching power supplies, and the like for which a higher withstand voltage (e.g., 3 kV or greater) is required.

The multilayer ceramic condenser disclosed in Japanese Patent Application Laid-Open No. HEI 8-37126 can attain a higher withstand voltage and raise the surface flashover voltage, but is hard to achieve a smaller size/lower profile and a larger capacity. Reasons therefor will be explained in the following.

Since a plurality of capacitors formed between the first and second inner electrodes are connected in series, capacitance decreases, so that a desirable capacitance cannot be secured. Though the number of inner electrode groups provided within the multilayer body may be increased so as to secure a desirable capacitance, this makes it difficult for the multilayer ceramic condenser to attain a smaller size and a lower profile. Though the thickness of the outer layer part not formed with the inner electrodes may be increased so as to raise the surface flashover voltage, the multilayer ceramic condenser is less likely to achieve a smaller size and a lower profile as the outer layer part becomes thicker.

It is an object of the present invention to provide a multilayer ceramic condenser which can achieve a smaller size, a lower profile and a larger capacity while attaining a higher withstand voltage and a higher surface flashover voltage.

The multilayer ceramic condenser in accordance with the present invention comprises a multilayer body constituted by a plurality of dielectric layers laminated together; first and second terminal electrodes respectively positioned on opposite side faces of the multilayer body; and a plurality of inner electrode groups, provided within the multilayer body in a laminating direction of the multilayer body, each including a first inner electrode connected to the first terminal electrode, a second inner electrode connected to the second terminal electrode, and a third inner electrode connected to none of the first and second terminal electrodes; wherein the first, second, and third inner electrodes are arranged so as to hold the dielectric layer therebetween such that a plurality of capacitors connected in series are formed between the first and second inner electrodes; and wherein the number of capacitors formed in the outermost inner electrode group in the laminating direction of the multilayer body is greater than the number of capacitors formed in the inner electrode group positioned on the inner side of the outermost inner electrode group.

Since a plurality of capacitors connected in series are formed between the first and second inner electrodes in each inner electrode group, the multilayer ceramic condenser in accordance with the present invention can attain a higher withstand voltage.

In the present invention, the number of capacitors formed in an inner electrode group positioned on the inner side of the outermost inner electrode group is smaller than the number of capacitors formed in the outermost inner electrode group. As a consequence, the combined capacitance of the capacitors formed in the inner electrode group positioned on the inner side of the outermost inner electrode group is greater than the combined capacitance of the capacitors formed in the outermost inner electrode group. When the number of capacitors formed in the outermost inner electrode group is made different from the number of capacitors formed in the inner electrode group positioned on the inner side, the combined capacitance of the whole ceramic condenser can be enhanced. As a result, the present invention can attain a smaller size and a lower profile than those simply increasing the number of inner electrode groups in order to secure a desirable capacitance.

In the present invention, the number of capacitors formed in the outermost inner electrode group in the laminating direction of the multilayer body is greater than the number of capacitors formed in the inner electrode group positioned on the inner side of the outermost inner electrode group. This weakens the electric field formed on the outside of the ceramic condenser, whereby the surface flashover voltage can be kept high.

Preferably, the number of capacitors formed in the outermost inner electrode group in the laminating direction of the multilayer body is 6.

Preferably, the number of third inner electrodes in the outermost inner electrode group in the laminating direction of the multilayer body is greater than the number of third inner electrodes in the innermost electrode group positioned on the inner side of the outermost inner electrode group.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having the same functions will be referred to with numerals identical to each other without repeating their overlapping descriptions.

Figure 1:
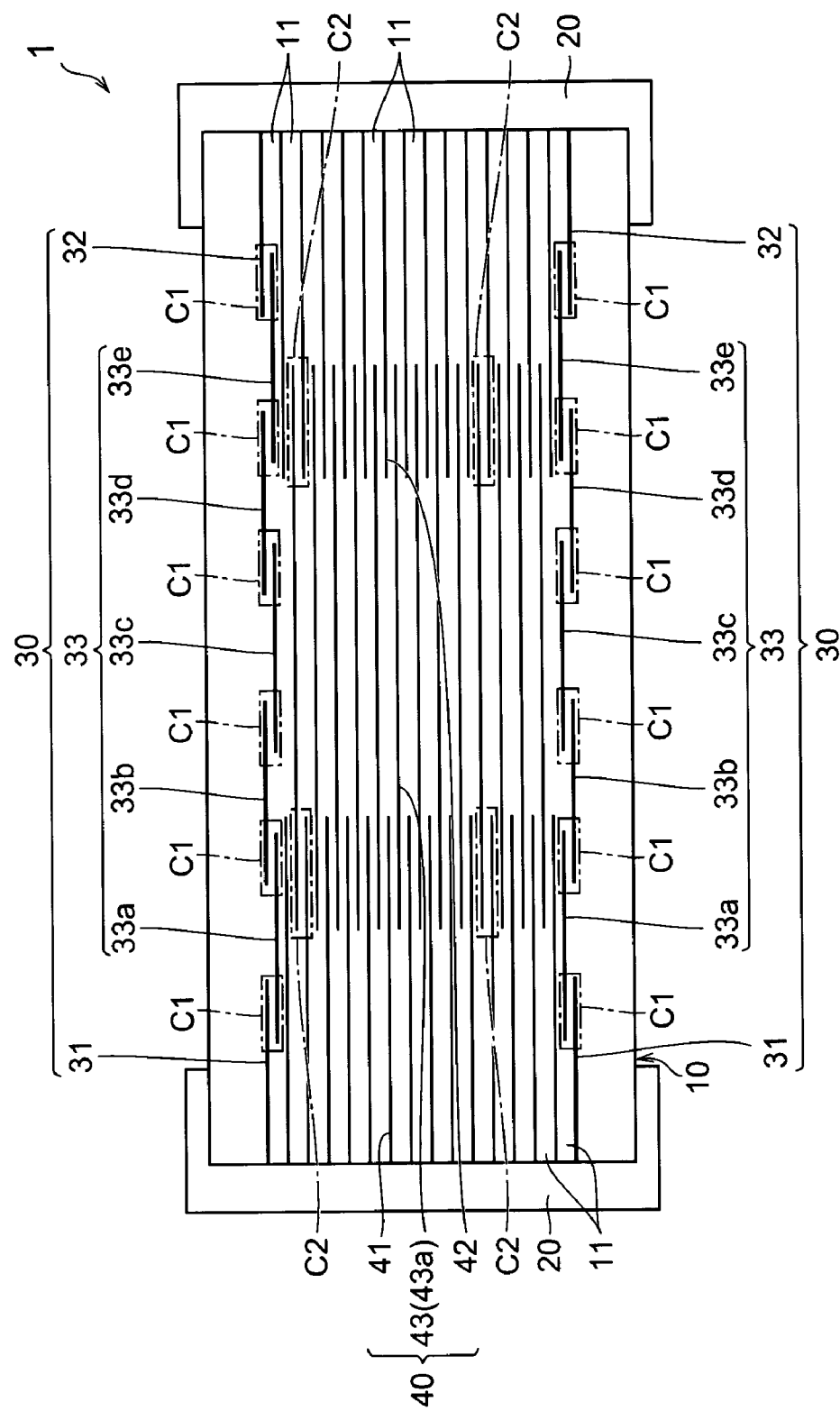
FIG. 1 is a view illustrating a cross-sectional configuration of a multilayer ceramic condenser in accordance with an embodiment.
Figure 2:
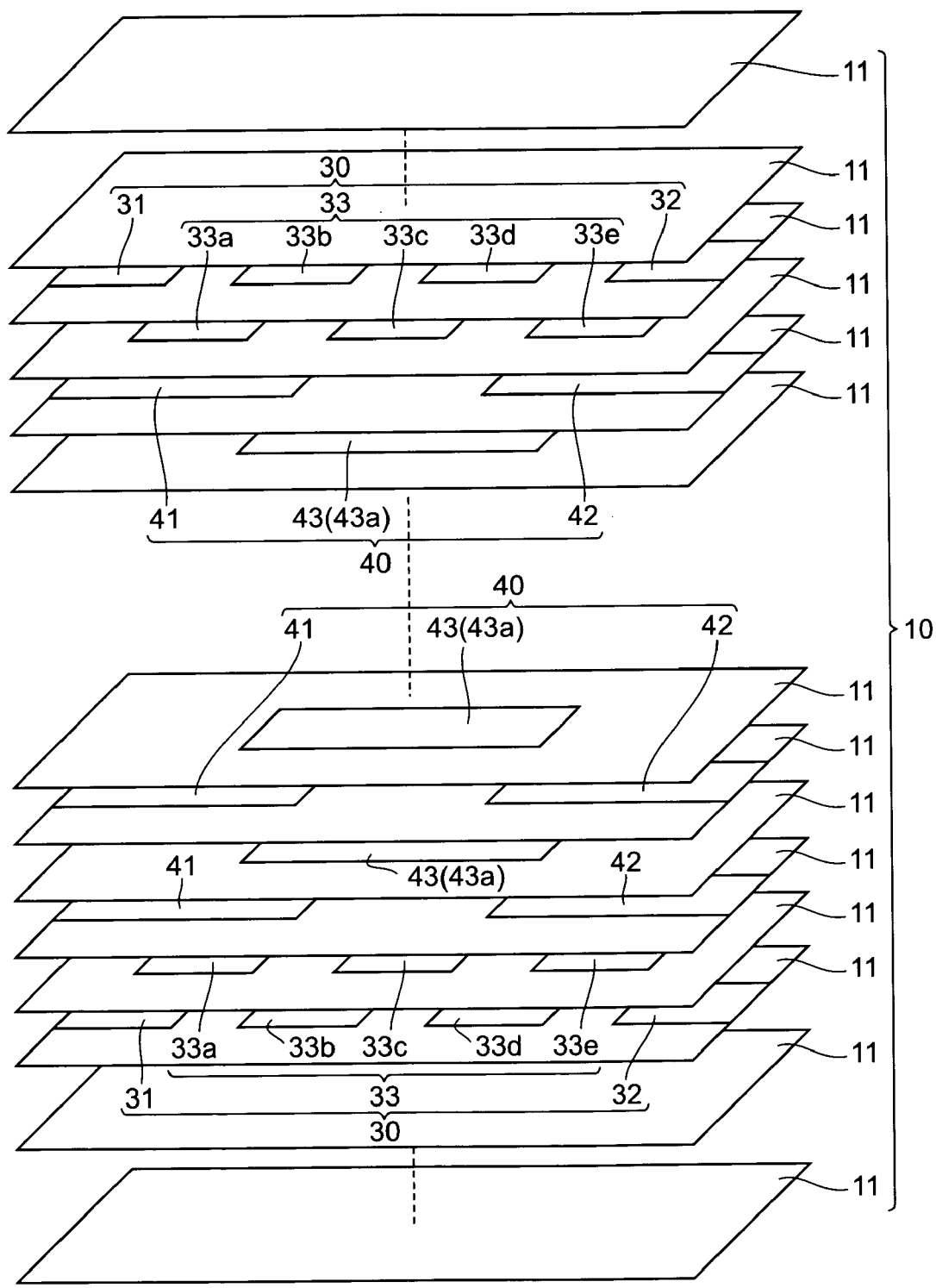
FIG. 2 is an exploded perspective view for explaining the configuration of the multilayer ceramic condenser in accordance with the embodiment.

First, the configuration of a multilayer ceramic condenser 1 in accordance with an embodiment will be explained with reference to FIGS. 1 and 2. FIG. 1 is a view illustrating a cross-sectional configuration of the multilayer ceramic condenser in accordance with this embodiment. FIG. 2 is an exploded perspective view for explaining the configuration of the multilayer ceramic condenser in accordance with this embodiment. FIG. 2 does not show terminal electrodes 20 which will be explained later.

The multilayer ceramic condenser 1 comprises a multilayer body 10; a first terminal electrode 20a, a second terminal electrode 20b; first inner electrode groups 30, and second inner electrode groups 40. The first terminal electrode 20a is positioned on a first side face of the multilayer body 10. The second terminal electrode 20b is positioned on a second side face of the multilayer body 10 opposite from the first side face. A plurality of first and second inner electrode groups 30, 40 are provided within the multilayer body 10 in the laminating direction of the multilayer body 10 (which will simply be referred to as "laminating direction" in the following). The multilayer body 10 is constituted by a plurality of dielectric layers 11 laminated together. The multilayer body 10 has a substantially rectangular parallelepiped form.

Figure 3:
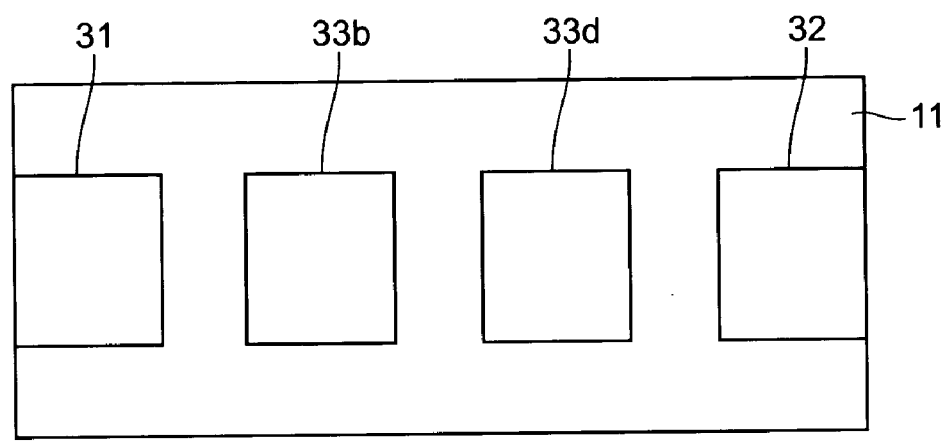
FIG. 3 is a plan view illustrating first to third inner electrodes owned by a first inner electrode group.

The first inner electrode groups 30 are positioned on the respective outermost sides in the laminating direction. Each first inner electrode group 30 includes a first inner electrode 31, a second inner electrode 32, and a third inner electrode 33. The first inner electrode 31 is connected to the first terminal electrode 20a but not to the second terminal electrode 20b. The second inner electrode 32 is connected to the second terminal electrode 20b but not to the first terminal electrode 20a. The first inner electrode 31 and second inner electrode 32 are positioned on the same layer (see FIGS. 2 and 3).

Figure 4:
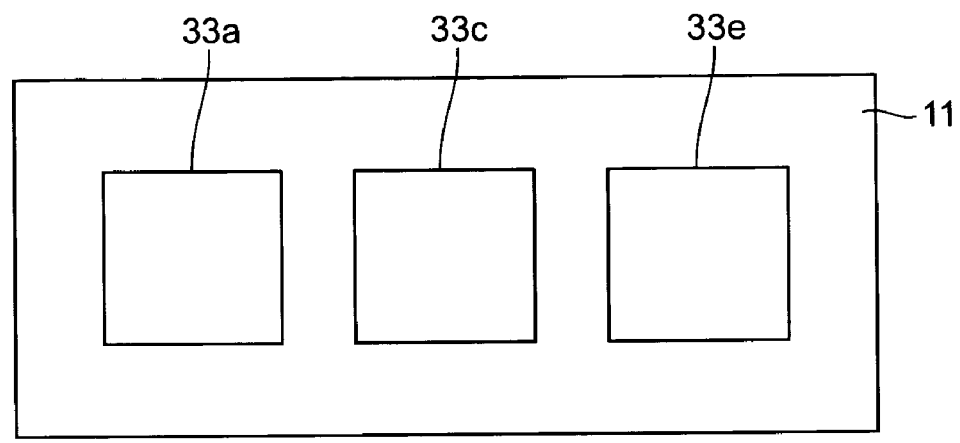
FIG. 4 is a plan view illustrating the third inner electrodes owned by the first inner electrode group.

The third inner electrode 33 is connected to none of the first and second terminal electrodes 20a, 20b, and includes a plurality of (5 in this embodiment) electrodes 33a to 33e. The electrodes 33b, 33d are positioned on the same layer as with the first inner electrode 34 and second inner electrode 32, while being disposed between the first inner electrode 31 and second inner electrode 32 (see FIGS. 2 and 3). The electrodes 33b, 33d are not connected to each other. The electrodes 33a, 33c, 33e are positioned on the same layer, and are arranged such that the dielectric layer 11 is held between these electrodes and the first inner electrode 31, second inner electrode 32, and electrodes 33b, 33d (see FIGS. 2 and 4). The electrodes 33a, 33c, 33e are not connected to each other. As a consequence, the first inner electrode 31, second inner electrode 32, and third inner electrode 33 (electrodes 33a to 33e) are arranged so as to hold the dielectric layer 11 therebetween such that a plurality of capacitors C1 connected in series are formed between the first inner electrode 31 and second inner electrode 32. In this embodiment, the number of capacitors C1 formed in each first inner electrode group 30 is 6.

Figure 5:
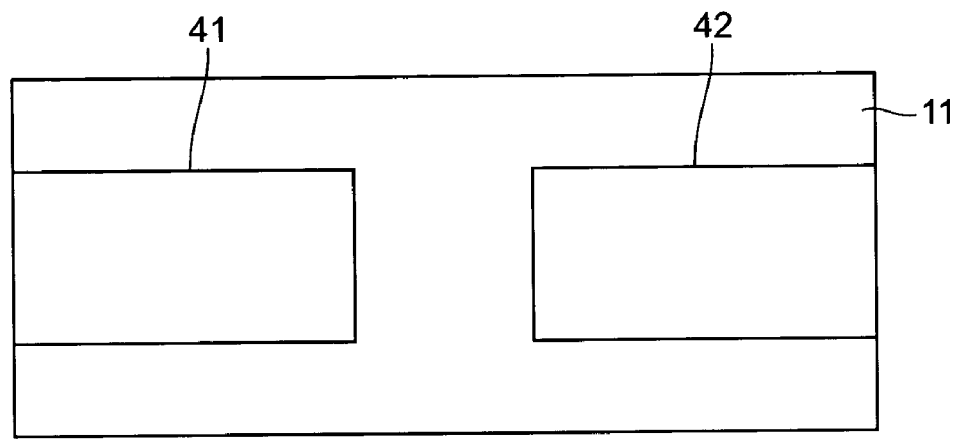
FIG. 5 is a plan view illustrating the first and second inner electrodes owned by a second inner electrode group.

A plurality of (13 in this embodiment) second inner electrode groups 40 are provided between the outermost first inner electrode groups 30 in the laminating direction, so as to be positioned on the inner side of the outermost first inner electrode groups 30 in the laminating direction. Each second inner electrode group 40 includes a first inner electrode 41, a second inner electrode 42, and a third inner electrode 43. The first inner electrode 41 is connected to the first terminal electrode 20a but not to the second terminal electrode 20b. The second inner electrode 42 is connected to the second terminal electrode 20b but not to the first terminal electrode 20a. The first inner electrode 41 and second inner electrode 42 are positioned on the same layer (see FIGS. 2 and 5).

Figure 6:
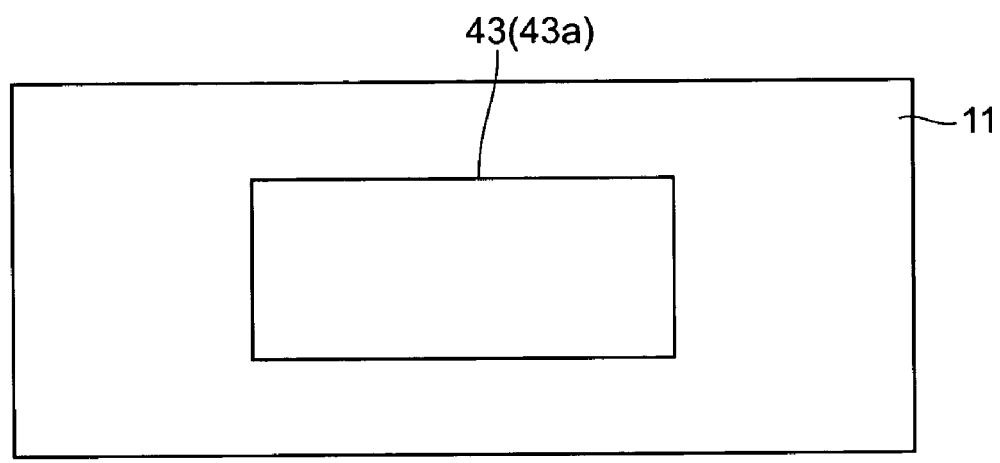
FIG. 6 is a plan view illustrating the third inner electrode owned by the second inner electrode group.

The third inner electrode 43 is connected to none of the first and second terminal electrodes 20a, 20b, and includes at least one (1 in this embodiment) electrode 43. The number of electrodes 33a to 33e included in the third inner electrode 33 of each first inner electrode group 30 is greater than the number of the electrode 43a included in the third inner electrode 43 of each second inner electrode group 40. The electrode 43a is disposed such that the dielectric layer 11 is held between this electrode and the first inner electrode 41 and second inner electrode 42 (see FIGS. 2 and 6). As a consequence, the first inner electrode 41, second inner electrode 42, and third inner electrode 43 (electrode 43a) are arranged so as to hold the dielectric layer 11 therebetween such that a plurality of capacitors C2 connected in series are formed between the first inner electrode 41 and second inner electrode 42. In this embodiment, the number of capacitors C2 formed in the second inner electrode group 40 is 2. Of the second inner electrode groups 40 neighboring the first inner electrode groups 30 in the laminating direction, one second inner electrode group 40 shares the third inner electrode 43 (electrode 43a) with its neighboring second inner electrode group 40 in the laminating direction.

As shown in FIG. 2, the multilayer ceramic condenser 1 is constructed such that the dielectric layers 11 formed with their corresponding electrodes in the electrodes 31 to 33, 41 to 43 are laminated in a predetermined order, and are held between a plurality of dielectric layers 11 formed with none of the electrodes 31 to 33, 41 to 43 from both sides in the laminating direction. The plurality of dielectric layers 11 free of the electrodes 31 to 33, 41 to 43 function as protective layers and the like.

A process of making the multilayer ceramic condenser 1 in accordance with this embodiment will now be explained.

First, an organic binder, an organic solvent, and the like are added to a powdery dielectric ceramic material, so as to yield a slurry. From this slurry, dielectric ceramic green sheets are manufactured by a known method such as doctor blading.

Subsequently, a plurality of conductor patterns (by the number corresponding to the number of divided chips which will be explained later) constructing their corresponding electrodes 31 to 33, 41 to 43 are formed for each dielectric ceramic green sheet. The conductor patterns constituting the electrodes 31 to 33, 41 to 43 are formed, for example, by screen-printing a conductor paste mainly composed of silver and then drying the paste.

Thereafter, dielectric ceramic green sheets formed with the conductor patterns and dielectric ceramic green sheets formed with no conductor patterns are laminated and pressed together in the order of lamination shown in FIG. 2, so as to yield an intermediate multilayer body constituted by a plurality of dielectric ceramic green sheets. Thus obtained intermediate multilayer body is cut into chips, which are fired after removing the organic binder (debindering). This yields a multilayer body 10 within which first and second inner electrode groups 30, 40 are provided.

Next, thus obtained multilayer body 10 is formed with first and second terminal electrodes 20a, 20b. The first and second terminal electrodes 20a, 20b are formed, for example, by applying a terminal electrode paste mainly containing Ag to opposite first and second side faces and then heating (burning) the paste. Thereafter, an Ni plating layer and an Sn plating layer are successively laminated on the outer surface of the terminal electrode 20 by electro-plating or the like. This yields the multilayer ceramic condenser 1.

As in the foregoing, a plurality of capacitors C1, C2 connected in series are formed between the first inner electrodes 31, 41 and the second inner electrodes 32, 42 in each of the inner electrode groups 30, 40, whereby a higher withstand voltage can be attained in this embodiment.

In this embodiment, the number of capacitors C2 formed in each of the second inner electrode groups 40 positioned on the inner side of the first inner electrode groups 30 is smaller than the number of capacitors C1 formed in each of the first inner electrode groups 30. As a consequence, the combined capacitance of the capacitors C2 formed in each of the second inner electrode groups 40 is greater than the combined capacitance of the capacitors C1 formed in each of the first inner electrode groups 30. Thus, when the number of capacitors C1 formed in the first inner electrode group 30 is made different from the number of capacitors C2 formed in the second inner electrode group 40, the combined capacitance of the whole multilayer ceramic condenser 1 can be increased. As a result, this embodiment can achieve a smaller size and a lower profile than one simply increasing the number of inner electrode groups in order to secure a desirable capacitance.

In this embodiment, the number of capacitors C1 formed in each of the first inner electrode groups 30 is greater than the number of capacitors C2 formed in each of the second inner electrode groups 40. As a consequence, the electric field formed on the outside of the ceramic condenser 1 becomes weaker, whereby the surface flashover voltage can be kept high.

The fact that this embodiment can keep the surface flashover voltage high will now specifically be shown by Working Example 1 and Comparative Example 1. In each of Working Example 1 and Comparative Example 1, while raising the DC voltage applied to terminal electrodes, the voltage at the time when surface flashover occurred (surface flashover voltage) was determined.

Figure 7:
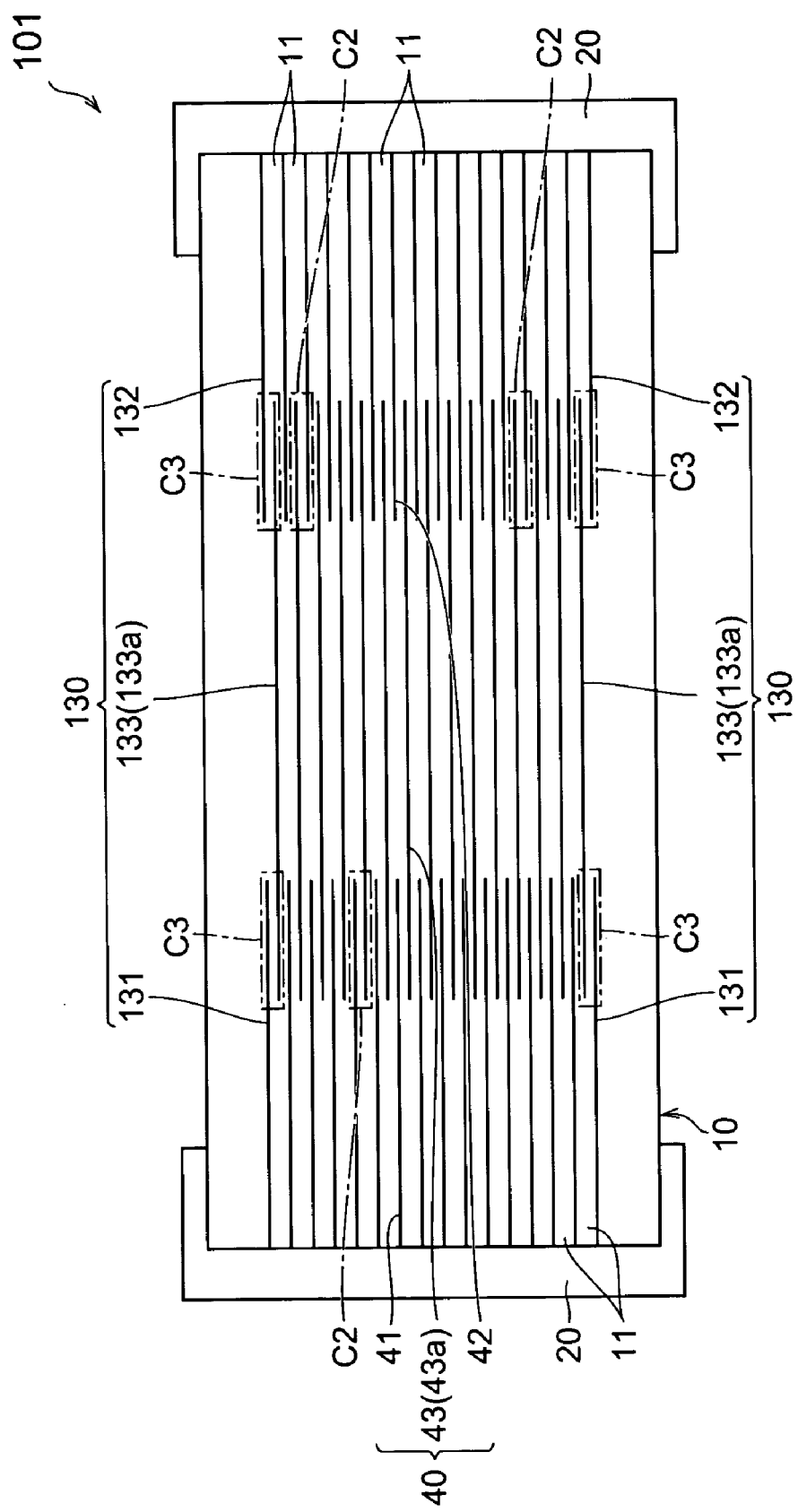
FIG. 7 is a view illustrating a cross-sectional configuration of the multilayer ceramic condenser in accordance with Comparative Example 1.

In Working Example 1, the multilayer ceramic condenser 1 in accordance with the above-mentioned embodiment was used. In Comparative Example 1, a multilayer ceramic condenser 101 shown in FIG. 7 was used. In the multilayer ceramic condenser 101, the number of capacitors formed in each of the outermost inner electrode groups in the laminating direction is identical to the number of capacitors formed in each of the inner electrode groups positioned on the inner side of the outermost inner electrode groups. The multilayer ceramic condenser 101 in accordance with Comparative Example 1 has the same configuration as that of the above-mentioned multilayer ceramic condenser 1 except for the number of capacitors formed in the outermost inner electrode groups in the laminating direction.

Each of outermost inner electrode groups 130 in the laminating direction in the multilayer ceramic condenser 101 in accordance with Comparative Example 1 has a first inner electrode 131, a second inner electrode 132, and a third inner electrode 133 as with each of second inner electrode groups 40 positioned on the inner side of the inner electrode groups 130 in the laminating direction. The first inner electrode 131 is connected to the first terminal electrode 20a but not to the second terminal electrode 20b. The second inner electrode 132 is connected to the second terminal electrode 20b but not to the first terminal electrode 20a. The first inner electrode 131 and the second inner electrode 132 are positioned on the same layer. The third inner electrode 133 is connected to none of the first and second terminal electrodes 20a, 20b, and includes one electrode 133a. The electrode 133a is disposed such that the dielectric layer 11 is held between this electrode and the first inner electrode 131 and second inner electrode 132. As a consequence, the first inner electrode 131, second inner electrode 132, and third inner electrode 133 (electrode 133a) are arranged so as to hold the dielectric layer 11 therebetween such that two capacitors C3 connected in series are formed between the first inner electrode 131 and second inner electrode 132.

As a result of measurement, the surface flashover voltage in Working Example 1 was 10.5 kV, whereas that in Comparative Example 1 was 8.0 kV. The foregoing verified the effectiveness of this embodiment.

Though a preferred embodiment of the present invention is explained in detail in the foregoing, the present invention is not limited to the above-mentioned embodiment. For example, though the number of capacitors C1 formed in each of the first inner electrode groups 30 and the number of capacitors C2 formed in each of the second inner electrode groups 40 are 6 and 2, respectively, they are not restrictive. It will be sufficient if the number of capacitors C1 formed in each of the first inner electrode groups 30 is greater than the number of capacitors C2 formed in each of the second inner electrode groups 40.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer ceramic condenser comprising:
   a multilayer body constituted by a plurality of dielectric layers laminated together;
   first and second terminal electrodes respectively positioned on opposite side faces of the multilayer body; and
   a plurality of inner electrode groups, provided within the multilayer body in a laminating direction of the multilayer body, each including a first inner electrode connected to the first terminal electrode, a second inner electrode connected to the second terminal electrode, and a third inner electrode connected to none of the first and second terminal electrodes;
   wherein the first, second, and third inner electrodes are arranged so as to hold the dielectric layer therebetween such that a plurality of capacitors connected in series are formed between the first and second inner electrodes; and
   wherein the number of capacitors formed in the outermost inner electrode group in the laminating direction of the multilayer body is greater than the number of capacitors formed in the inner electrode group positioned on the inner side of the outermost inner electrode group.

2. A multilayer ceramic condenser according to claim 1, wherein the number of capacitors formed in the outermost inner electrode group in the laminating direction of the multilayer body is 6.

3. A multilayer ceramic condenser according to claim 1, wherein the number of third inner electrodes in the outermost inner electrode group in the laminating direction of the multilayer body is greater than the number of third inner electrodes in the innermost electrode group positioned on the inner side of the outermost inner electrode group.

* * * * *